United States Patent [19]

Tauscheck

[11] Patent Number: 4,832,558
[45] Date of Patent: May 23, 1989

[54] GLASS HANDLING APPARATUS

[76] Inventor: Russell W. Tauscheck, P.O. Box 4114, Oakland, Calif. 94614

[21] Appl. No.: 144,517

[22] Filed: Jan. 15, 1988

[51] Int. Cl.$^4$ .............................................. B66C 1/24
[52] U.S. Cl. .............................. 414/798.9; 294/67.22
[58] Field of Search ....................... 414/114, 115, 330; 294/67.2, 67.21, 67.22, 67.32

[56] References Cited

U.S. PATENT DOCUMENTS

| | | | |
|---|---|---|---|
| 1,753,578 | 4/1930 | Raymond | 294/67.22 |
| 4,181,341 | 1/1980 | Henke | 294/67.22 |
| 4,489,970 | 12/1984 | Henke | 294/67.22 |
| 4,522,544 | 6/1985 | Shah et al. | 414/330 |

Primary Examiner—Leslie J. Paperner
Attorney, Agent, or Firm—John J. Leavitt

[57] ABSTRACT

Presented is an apparatus for handling flat panes of plate glass. After manufacture, flat panes of glass are stored in large warehouses prior to distribution to glass distributors and wholesalers. Flat panes of glass are stored standing on edge, with multiple panes making up a "block" in which the individual panes are in close abutting relation to each other. "Blocks" of glass are supported on wood stringers lying flat on a concrete floor, and wood spacer members separate one "block" from the next adjacent "block." The apparatus of this invention includes a steel frame the lower edge of which is provided with adjustable "feet" that project under a "block" of glass and which can separate one or more panes from the "block." After elevating the selected and separated panes of glass above the remaining "block", telescoping fingers mounted on the upper edge of the frame move into position behind the separated panes to retain the separated panes on the frame for movement to a desired location. Adjustable gauges are provided on the frame which can be set to control the number of panes of glass selected to be picked up by the "feet."

13 Claims, 4 Drawing Sheets

GLASS HANDLING APPARATUS

BACKGROUND OF THE INVENTION

1. Field of the Invention

This invention relates to glass handling apparatus for handling large panes of flat glass, and particularly to an apparatus that may be used to separate a single or a selected number of panes from a larger number of panes making up a "block" of glass panes.

2. Description of the Prior Art

A search of the prior art has revealed the existence of the following U.S. Pat. Nos. 1,621,650; 2,801,876; 2,828,870; 3,838,779; 3,909,056; 3,913,965; and 4,489,970. Only three of these patents relate to glass handling apparatus, and none of these three disclose the invention described herein.

It is not generally known that flat panes of glass, such as glass commonly known as "float" glass, is manufactured in large flat sheets or panes ranging between 168" to 240" long and ranging from 128" to 130" wide. Panes of glass in these large sizes are conventionally paced side-by-side in contiguous juxtaposition to form a "pak" or "block" of glass panes. These "paks" or "blocks" weigh either 5,000 pounds or about 10,000 pounds, and have thicknesses from 2" to 4". One reason that glass manufacturers store the glass panes in 5,000 and 10,000 pound paks is that end users (the manufacturer's customers who cut the large sheets into smaller glass panes) are generally equipped with maximum hoisting capacity that varies from 5,000 to 10,000 pounds. But this arrangement requires that 5,000 pound paks be stored separately from 10,000 pound paks in the manufacturer's warehouse, i.e., in a different area, and that each pak be separated from the next adjacent pak by blocking that creates a 2" to 3" space between adjacent paks. This space is required to permit encirclement of the ends of the pak by nylon slings that are conventionally used to lift paks of glass. Such blocking takes up valuable floor space, e.g. up to 50% of the total storage floor area is taken up by these "spaces" between each pak.

It will thus be understood that conventional storage practices for flat float glass is wasteful of floor space, which could be used to great advantage in storing more glass in a given floor area.

The reason conventional glass handling practices require the arrangement of the glass in paks constituted of a limited number of panes is that conventional glass handling apparatus must hoist the entire pak as a unit to prevent shattering of the brittle and fragile glass panes. Since a pak 2" thick containing eight panes of ¼" thick float glass (of the size 130"×204") weighs about 5,000 pounds, it is readily understood that the type and capacity of the hoisting equipment used by the customers is one of the factors that dictates the conventional practice of storing glass in 5,000 pound and 10,000 pound paks at the manufacturer's plant.

Another reason that "loose" glass, i.e., uncased glass, has not heretofore been stored in a solid "block" of indefinite thickness is that heretofore the glass manufacturers have lacked the mechanical equipment that would enable them to stack 5,000 pound and 10,000 pound paks in contiguous juxtaposition, and have likewise lacked the mechanical equipment that would enable them to retrieve from such a solid "block" of glass a predetermined number of panes of glass to make up a 5,000 or 10,000 pound pak for shipment to a customer.

Accordingly, it is one of the objects of my invention to provide a glass handling apparatus that is capable of stacking and retrieving a predetermined multiplicity of panes of glass to or from a solid "block" of indefinite thickness of such glass panes that are stored on edge in a nearly vertical attitude.

Another object of the invention is the provision of a glass handling apparatus that is also capable of retrieving a single pane of glass from a "solid" block of such glass panes, and transporting such glass pane to another location.

Glass handling equipment heretofore used to retrieve glass paks from storage conventionally require three workers to engage the lifting equipment (nylon slings) to the glass paks—one on the hoist and one at each end of the pak to engage the nylon lifting slings to both ends of the glass pak. A still further object of the invention is the provision of a glass handling apparatus that engages the glass pak automatically, eliminating the need for attaching nylon slings to both ends of the pak and which may be operated by a single person, thus saving the labor expense usually incurred through use of conventional glass handling methods, including the need for workmen to stand by as the glass pak is about to be lifted to make sure that the nylon slings are properly engaged to the glass pak before lifting commences.

A still further object of the invention is the provision of a glass handling apparatus equipped with gauge means that may be pre-set to select a predetermined number of panes of glass from a solid "block" of such glass panes.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the glass handling apparatus of the invention comprises a rectilinear frame, conveniently fabricated from an appropriate material such as steel, aluminum alloy or synthetic resinous material, or combinations of these materials. Means are provided on one end of the frame for attachment of a hoist for elevating the frame, while at selected locations on the frame means are provided for gauging the depth of penetration of a pair of glass-grab "feet" mounted on the end of the frame opposite the hoisting means, and adapted to penetrate below the pak of glass and separate a predetermined number of glass panes from those remaining in the "block". Means are also provided on the frame opposite the glass-grab "feet" for engaging the glass and forming a "backstop" restraining movement of the top edge portions of the panes of glass away from the frame.

DESCRIPTION OF THE PREFERRED EMBODIMENT

Figure 1:
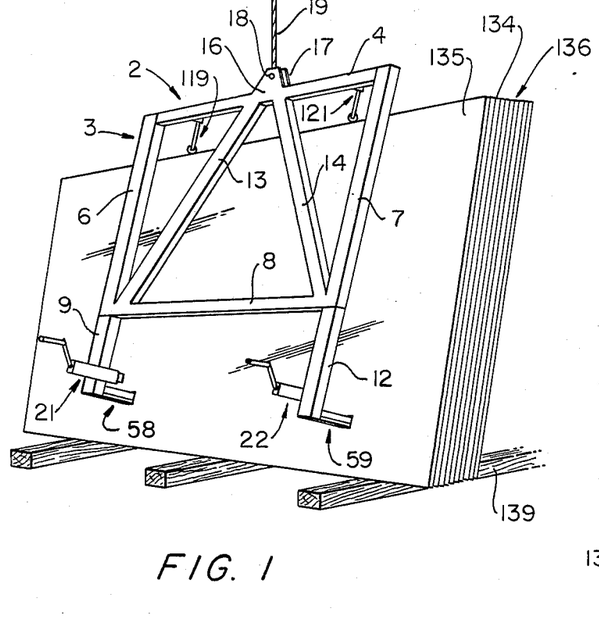
FIG. 1 is a perspective view illustrating the glass handling apparatus of the invention being applied to a "block" composed of a multiplicity of separate but juxtaposed panes of glass.

In terms of greater detail, and referring to FIG. 1, my glass handling apparatus is designated generally by the numeral 2, and includes a rectilinear frame 3, having an upper horizontal beam 4, left and right side beams 6 and 7, respectively, each integral at one end with an associated end of the beam 4, and depending perpendicularly therefrom in parallelism with each other and in a common plane with each other and with the beam 4. Integrally joined to the side beams 6 and 7 intermediate their ends is a lower horizontal beam 8 arranged parallel to the beam 4. As illustrated, portions 9 and 12 of side beams 6 and 7, respectively, extend below the lower beam 8.

To lend rigidity to the frame thus formed, diagonal brace beams 13 and 14 are provided, extending integrally between the union of beams 6 and 8 on the one hand, and the union of beams 7 and 8 on the other hand, and a median portion 16 of the upper horizontal beam 4. Hoisting plates 17 are welded to the upper beam 4 at its midpoint, adapted to receive a heavy pin 18 to which may be connected a cable 19 for hoisting the apparatus.

In the embodiment of the invention illustrated in FIGS. 1 through 11, inclusive, the apparatus is provided with a pair of selectively adjustable gauge members designated generally by the numerals 21 and 22. The left gauge member is fixed on the side beam extension 9 adjacent its lower end as shown, while the right gauge member is fixed on the side beam extension 12 in a corresponding position adjacent the lower end thereof. The two gauge members are identical and the description of one will apply to the other.

Figure 12:
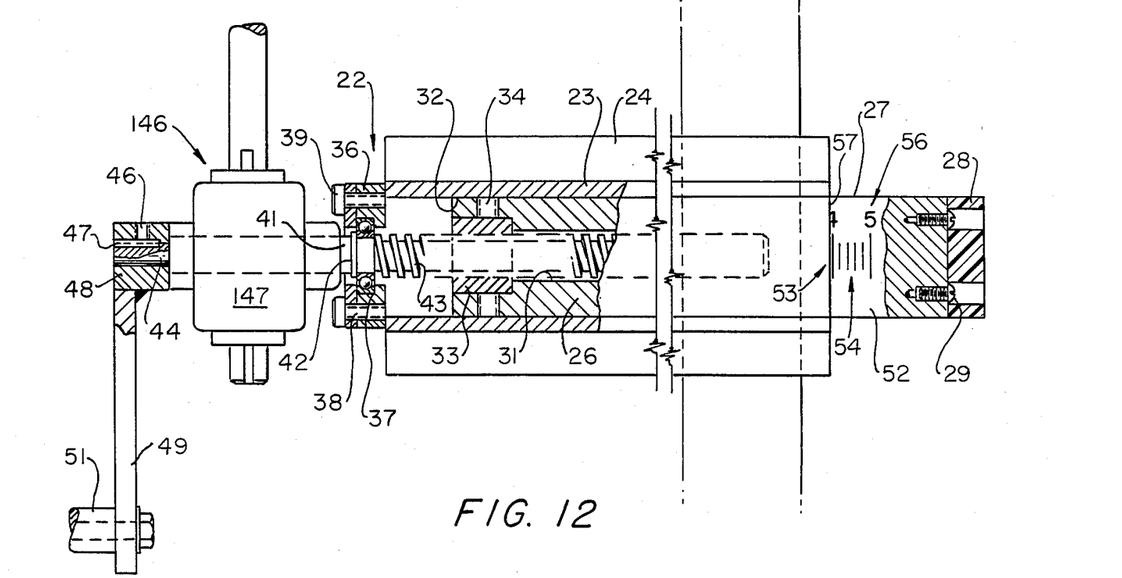
FIG. 12 is a fragmentary plan view, shown partly in horizontal cross-section, of the adjustable gauge member which may selectively be adjusted to control the depth of penetration of the "foot" beneath a "block" of glass panes to thereby determine the number of panes selected for separation from the "block."

Thus, referring to FIG. 12 wherein the gauge member 22 is shown in enlarged scale, it will be seen that each gauge member includes a tubular housing 23, preferably of steel, welded on a mounting flange 24 by which the gauge member is fixed to the associated side beam extension by appropriate cap screws or by welding. The tubular housing 23, which preferably possesses a rectangular cross-section, constitutes a slide bearing for an adjustable ram 26. The ram slidably fits snugly within the tubular housing and includes an exposed end portion 27 having a resilient cushioning pad 28 attached to the exposed end of the ram by appropriate screws 29.

The opposite end of the ram is provided with a longitudinally extending bore 31 as shown, and a counterbore 32 adapted to receive an internally threaded sleeve 33 detachably secured in the counterbore against both axial and rotational displacement by appropriate set screws 34. Detachably mounted on the end of the housing 23 associated with the threaded sleeve 33 is a bearing block 36 in which is mounted the outer race of a ball bearing assembly 37. The ball bearing assembly is retained by annular retainer plate 38 detachably secured to the bearing block 36 by cap screws 39.

Rotatably mounted on the inner race of the ball bearing assembly 37 is an elongated shaft 41 having a thrust collar 42 and a threaded spindle portion 43 that threadably engages the threads of sleeve 33 and beyond the sleeve projects freely into the elongated bore 31. On its opposite end 44, the shaft is fixed by a set screw 46 and key 47 to the hub 48 of a crank-arm 49 having a handle 51 for manual rotation of the crank-arm. As illustrated in FIG. 12, the surface 52 of the exposed portion 27 of ram 26 is provided with indicia designated generally by the numeral 53 and including linear graduations 54 and numeric indicia 56.

Thus, by rotating the crank-arm 49, threaded spindle portion 43 is caused to rotate in bearing assembly 37, but is held captive against axial displacement by the thrust collar 42 on the one hand and the threaded spindle portion on the other hand. Rotation of the threaded spindle portion 43 in the threaded sleeve 33 thus causes the sleeve and attached ram 26 to be displaced axially of the housing, exposing more or less of the ram portion 27. The extent of projection of the ram portion 27 may be controlled by indexing an appropriate indicia 53 with the end edge 57 of the housing.

The adjustable gauge assemblies 21 and 22 cooperate with a pair of spaced "foot" assemblies designated generally by the numerals 58 and 59, which function as "glass pane grabbers" in a manner which will hereinafter be described. As illustrated in FIGS. 1-6, the glass pane grabber "foot" assemblies 58 and 59 are fixed to the lower end portions of side beam extensions 9 and 12, respectively, each projecting perpendicularly from the associated beam extension as a cantilever beam. The two "feet" constituting the pair are thus spaced apart the width of the rectilinear frame, extend parallel to each other and at the same height in relation to the bottom ends of the side beam extensions 9 and 12, and extend away from the beam extensions for about seven inches. Since each "foot" is identical to the other, the following description of one applies to both.

Figures 7, 8, 9:
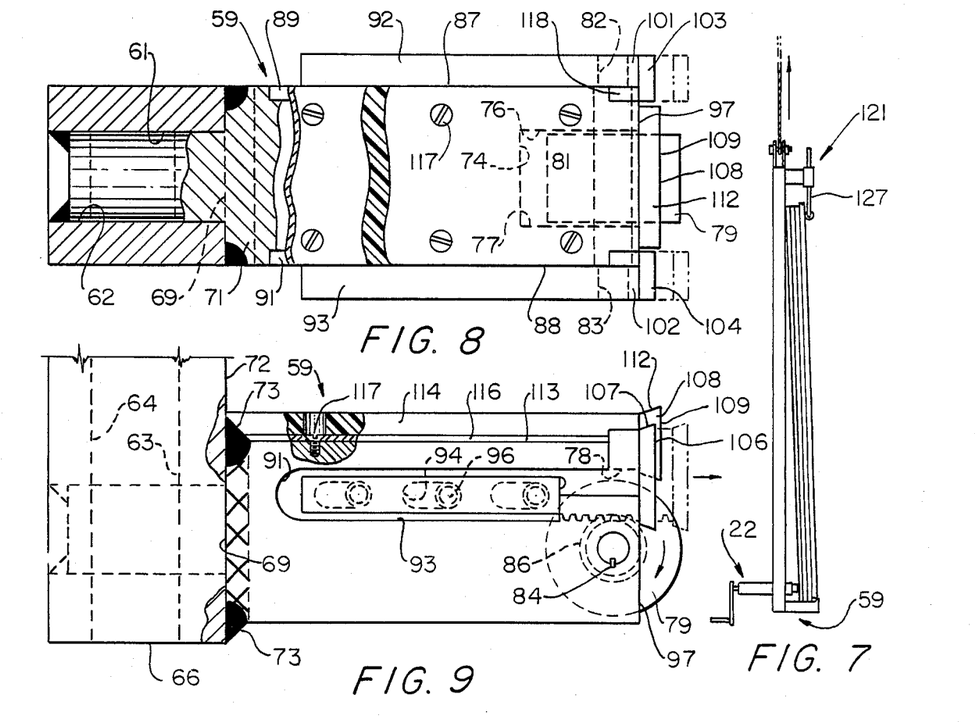
FIG. 7 is a side elevational view of the glass handling apparatus supporting the selected number of glass panes detached from the remaining panes of the "block."
FIG. 8 is a plan view of one of the "feet" which function to separate a predetermined number of panes of glass from a larger number in the "block."
FIG. 9 is a side elevational view of the "foot" of FIG. 8, portions being shown in section to reveal the underlying structure.

Referring to FIGS. 8 and 9, it will be seen that each side beam extension portion 9 and 12 is formed from heavy-walled square cross-section tubing. Two aligned apertures 61 and 62 are bored in opposite walls 63 and 64, respectively, of the tube adjacent its bottom end 66. Inserted into the aligned apertures 61 and 62 is a heavy steel anchor pin 67, welded at its beveled end 6 to the wall 64 within the aperture 62. At its opposite end, the pin is integral with the end surface 69 of a monolithic steel bar 71, conveniently about 3" square in cross-section and about 7" long measured from the face 72 of the tube wall 63 against which it abuts and to which it is welded by a heavy bead 73 on all four sides of the bar.

At its opposite free end, the bar 71 is provided with a generally rectangular recess formed by a rear wall 74, side walls 76 and 77, and top wall 78 (FIG. 9). The recess accommodates a wheel 79, preferably formed from polyurethane and being about the size of a skateboard wheel. The wheel 79 is press-fitted onto an axle 81 and is confined between the side walls 76 and 77, with the axle portions on opposite sides of the wheel being suitably journaled for rotation in appropriate aligned transverse bores in the side walls 76 and 77 of the recess. Outboard of the side walls 76 and 77, the shaft end portions 82 and 83 are reduced in diameter and slotted to receive Woodruff keys 84 utilized to secure pinion gears 86 mounted on the axle shaft end portions against rotation relative to the shaft. The pinion gears are retained on the shaft ends by appropriate snap rings (not shown).

Milled longitudinally into the opposite side surfaces 87 and 88 of the bar are elongated channels 89 and 91 adapted to slidably receive elongated arms 92 and 93, respectively, generally U-shaped over a major portion of their length and formed with elongated bearing slots 94 spaced along their length as shown in FIG. 9. The bearing slots slidably receive a journal sleeve (not shown) secured to the bar by an appropriate cap screw and washer assembly 96, whereby the elongated arms 92 and 93 are secured to the bar but are free to slide longitudinally in the channels 89 and 91 within the limits imposed by the length of the elongated slots 94.

On each elongated arm 92 and 93, adjacent its forward end associated with the free end 97 of the bar 71, there is milled an elongated recess adapted to fixedly receive a toothed rack 98 (FIG. 9) having teeth 99 adapted to mesh with the teeth of the associated pinion gear 86. Additionally, the forward ends of the arms 92 and 93 are provided with face plates 101 and 102 to which are secured resilient cushion pads 103 and 104, respectively. As illustrated in FIG. 9, each cushion pad is formed with a front face 106 that intercepts an upwardly inclined top surface 107, the front face and the top surface forming an acute angle. Preferably, the cushion pad is formed from a tough synthetic resinous material such as polyurethane. In like manner, a resilient cusion pad 108 is fixed on the free end 97 of the bar and is provided with a front face 109 intercepting an upwardly angled top surface 112 in an acute angle. It should be noted that in the retracted position of the arms 92 and 93 as shown in full lines in FIGS. 8 and 9, the cushion pad 108 projects forwardly beyond the faces 106 of the pads 103 and 104. However, when the arms 92 and 93 are extended, as shown in broken lines in FIGS. 8 and 9, this relationship is reversed and the pads 103 and 104 project beyond the pad 108 as shown.

To further cushion the "foot" so as to safely support one or a multiplicity of panes of glass, the top surface 113 of the bar (FIG. 9) is equipped with a flat rectangular cushion 114 vulcanized to mounting plate 116, which is in turn detachably secured to the top surface 113 of the bar by appropriate mounting screws 117. Note that the forward end of the rectangular cushion 114 is notched at its corners 118 to accommodate the retracted condition of the arms 92 and 93, and abuts the back surface of the cushion pad 108. It will thus be seen that the top and front surfaces of each "foot" are provided with cushions on all surfaces apt to come into physical contact with the glass panes being handled.

Figure 10:
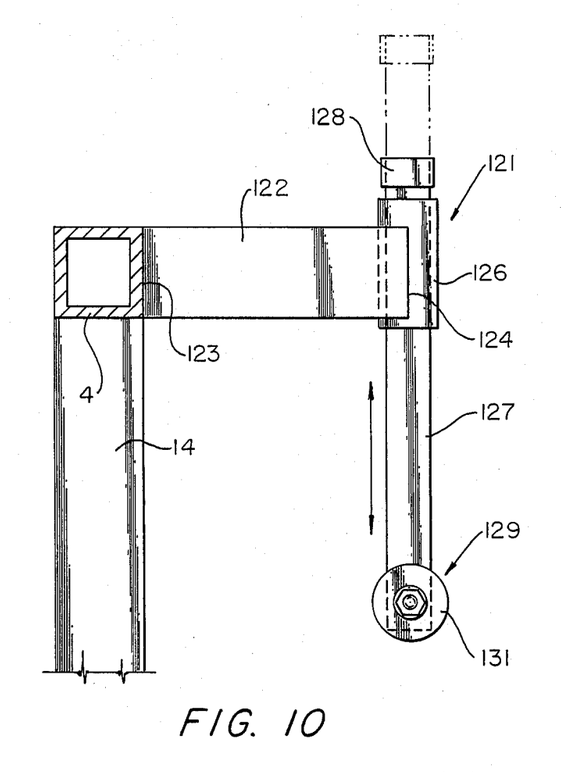
FIG. 10 is a fragmentary side elevational view of one of the telescoping "backstop" members.
Figure 11:
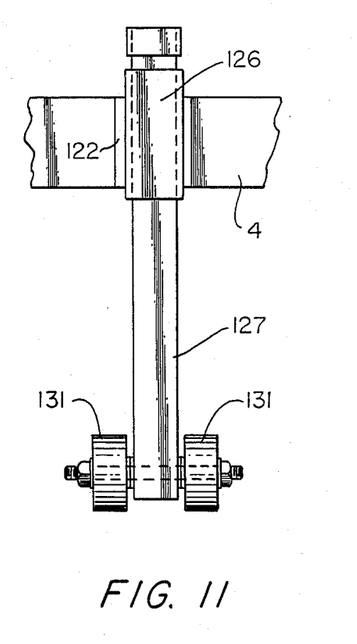
FIG. 11 is a front elevational view of the telescoping "backstop" member.

To lend stability to the single pane or multiple panes of glass being handled by the apparatus of my invention, there is provided mounted on the upper horizontal beam 4 of the frame, a pair of spaced "backstop" assemblies designated generally by the numerals 119 and 121. The assemblies 119 and 121 are identical, and the description of one assembly, as illustrated in detail in FIGS. 10 and 11, therefore applies to the other. Referring to FIGS. 10 and 11, each assembly is mounted inboard from the side beams 6 and 7, as shown, so that the assemblies are visible to the operator of the crane hoisting the glass "block" or multiple panes of glass. The crane operator is thus enabled to visually observe the proper operation of the "backstop" assemblies and interrupt the hoisting operation if there is a malfunction.

Each "backstop" assembly includes a monolithic mounting bar 122, one end 123 of which is welded to the upper horizontal beam 4 so that the bar extends perpendicularly therefrom as a cantilever. The free end 124 is formed with a rectangular recess which forms a seat to receive a square tube 126 welded therein. The longitudinal axis of the tube is perpendicular to the bar and parallel to the plane of the frame 3 but displaced therefrom by the length of the bar. Slidably mounted in the tube 126 is an elongated bar 127, preferably having a square cross-section and sized to slide freely in relation to the tube 126. The upper end of the bar 127 is provided with a stop head 128, while the lower end of the bar on the opposite side of the tube 126 is provided with a rotatable bearing assembly designated generally by the numeral 129 and comprised of a pair of wheels 131 and 132 rotatably mounted on an axle 133 the axis of which is parallel to the frame 3 and perpendicular to the elongated bar 127. The wheels are preferably formed from a tough synthetic resinous material such as polyurethane. As seen in FIGS. 10 and 11, the weight of the bar 127 and attached wheels normally retains the assembly in its lowermost position as shown in full lines. However, if the wheels encounter an obstruction while the frame is being lowered, such as the top edges 134 of a "block" of glass, the bar 127 will slide upwardly to accommodate the obstruction.

In operation and referring to FIGS. 1-7, the glass handling apparatus of my invention is suspended by the cable 19 from an appropriate crane (not shown) and moved so that it lies juxtaposed against the exposed pane 135 of a multiplicity of panes making up a "block" 136 of glass panes, all supported in a slightly tilted attitude, about three to five degrees from the vertical, by an appropriate support structure designated generally by the numeral 137, and including the inclined back brace 138 and the floor stringers 139 on which the glass "block" rests spaced above the floor on which the stringers are supported.

Figure 2:
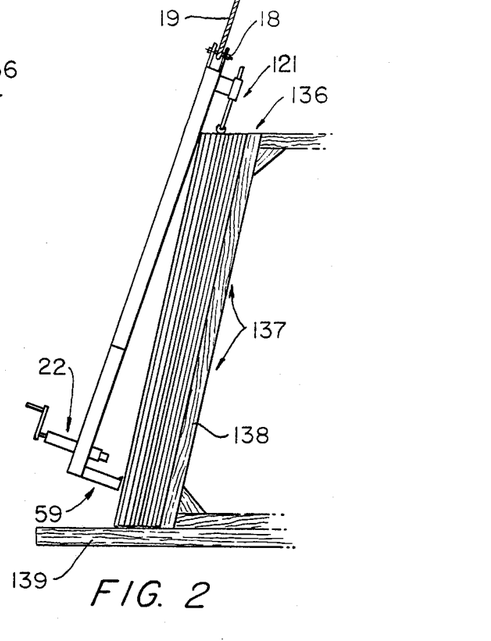
FIG. 2 is a side elevational view of the glass handling apparatus shown in FIG. 1.

Prior to hoisting the apparatus, the operator of the crane must know how many panes of glass he is to pick up and move. Knowing this, he manipulates the handle 51 of the crankarm 49 to advance the adjustable ram a predetermined distance which, when correlated to the extension of the associated "foot", results in there being only space enough on the foot for the prescribed number of panes of glass. Having adjusted the rams, the frame is laid gently against the "block" of glass as shown in FIG. 1. In this position of the frame, as shown in FIG. 2, the upper portions of the side beams rest against the upper edge of the exposed pane 134, and the wheel 79 mounted on each "foot" assembly 58 and 59 rests against the surface of the exposed pane of glass. Also, in this initial position of the frame, the "backstop" assembly elongated bars 127 are in their extended lower position with the bearing wheels 131 and 132 resting on the top edges 134 of the glass "block" but spaced rearwardly from the exposed first pane 135 as shown.

Now, as the crane lowers the frame in relation to the "block" of glass panes, the wheel 79 will rotate counterclockwise due to friction imposed on the wheel periphery, which bears against the pane 135. Rotation of the wheel rotates the pinion in the same counterclockwise direction, resulting in the toothed rack being displaced to the left to retract the elongated arms and the attached cushion pads 103 and 104 to their rear-most position as shown in FIG. 9. The wheel will continue to rotate as long as it is in contact with the glass, this frictional engagement being more forceful than the press fit of the wheel on the axle. Simultaneously, as the frame is lowered, the "backstop" assembly bars 127 are effectively retracted, the bars remaining stationary because they abut the upper edge 134 of the "block" while the tube 126 slides down in relation to the bar 127.

Figure 3:
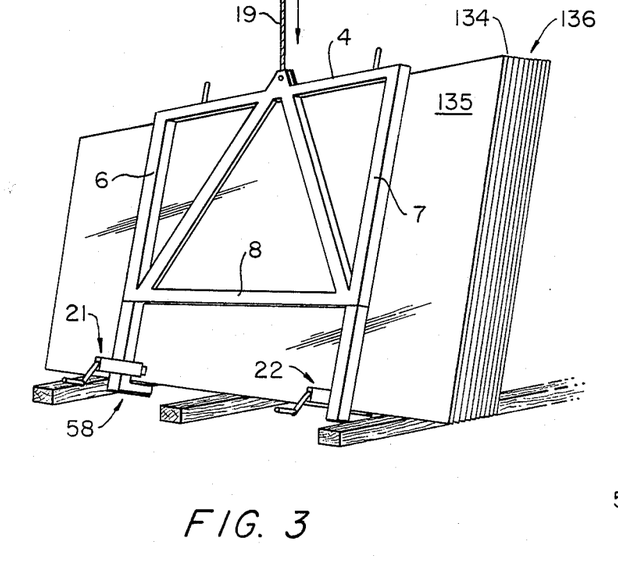
FIG. 3 is a view similar to FIG. 1, but illustrating the glass handling apparatus in position to engage and lift a pre-selected number of panes of glass from a larger number of panes forming a "block" of such panes of glass.
Figure 4:
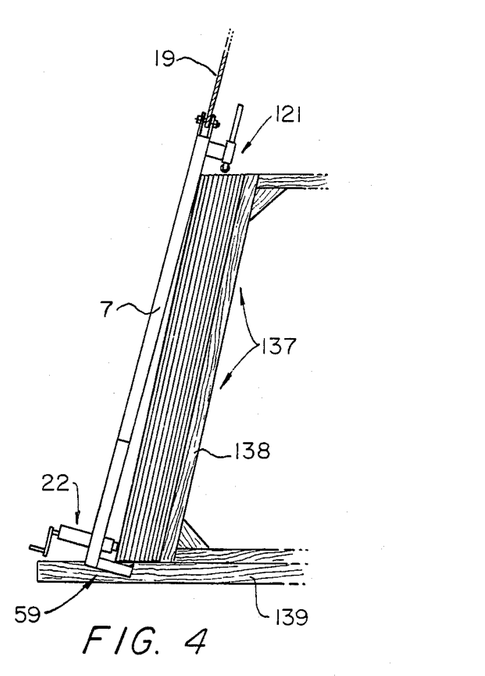
FIG. 4 is a side elevational view illustrating the relationship between the gauge-controlled "foot", the selected number of panes to be "grabbed" by the "foot" and the upper telescoping "backstop" members that automatically deploy behind the selected panes of glass as they are lifted.
Figure 5:
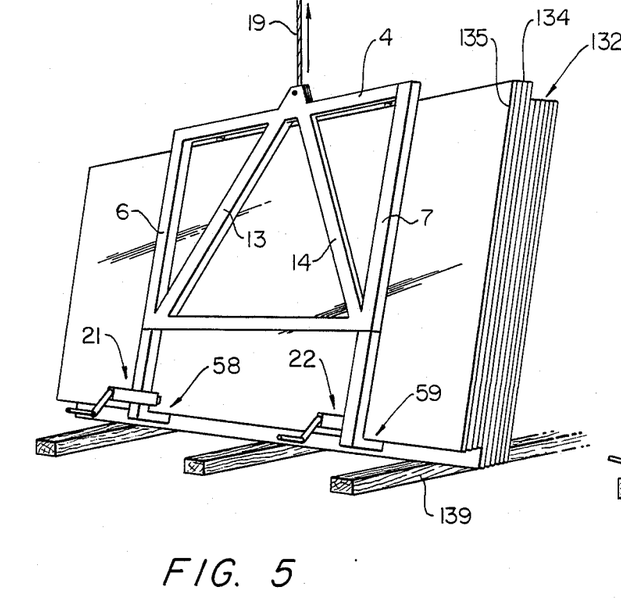
FIG. 5 is a view similar to FIG. 3 but illustrating the glass handling apparatus elevated to lift the selected number of panes relative to the panes remaining in the "block."
Figure 6:
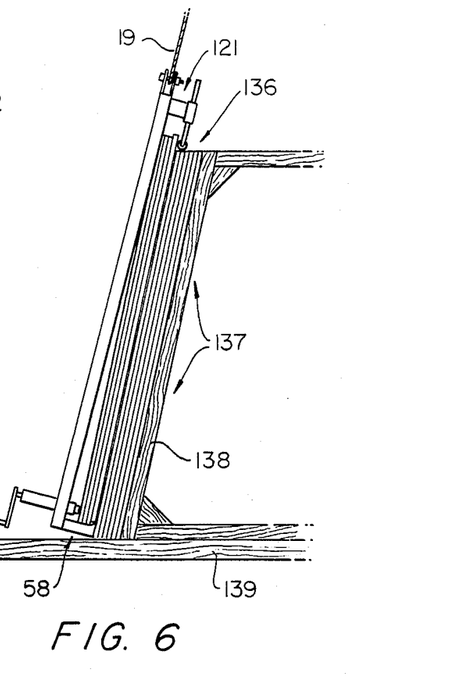
FIG. 6 is a side elevational view similar to FIG. 4, but illustrating the apparatus in the elevated condition of FIG. 5, and illustrating the telescoping "backstop" members engaged behind the group of selected and now elevated panes of glass.

When the frame has been lowered sufficiently that the wheel 79 on each "foot" slips under the lower edge of the "block" of glass panes, the cushioning pad 108 will come into contact momentarily with the surface of the exposed pane 135 very close to its lower edge, and then this pad, too, will slip below the edge of the "block" as lowering of the frame progresses. The lower end of the frame will now swing toward the "block" of glass, and the cushioning pads 28 on the ends of the adjustable rams of the gauge assemblies 21 and 22 will come to rest against the surface of the exposed pane of glass in the "block". This relationship of the frame and the "block" of glass is shown in FIGS. 3 and 4. Note also the completely retracted condition of the "backstop" assemblies engaging the top surface of the "block".

Referring to FIGS. 4 and 9, the distance between the face of the cushioning pad 28 on each adjustable gauge assembly ram and the face 109 of the cushioning pad 108 on the front face 97 of the bar 71 of each "foot" is precisely correlated to the thickness of the number of panes of glass intended to be picked up and separated from the remainder of the "block" of glass. Thus, if the glass panes are ¼" thick, four such panes would have a combined thickness of 1" and that would be the distance measured between the faces of the cushioning pads noted. It will thus be understood that by manipulating the adjustable gauges to control the distance between the faces of the cushioning pads 28 and 108, any predetermined number of glass panes may be selected, up to the maximum number for which the capacity of the apparatus is designed.

To separate from the "block" of panes the precise number of panes pre-selected, the crane is now manipulated to elevate the frame. As elevation occurs, the top inclined surface 112 of cushioning pad 108 engages the bottom edge of the innermost pane selected, say the fourth pane back from the exposed pane 135 of the "block". As elevation of the frame progresses, the lower edges of the other selected panes will engage the top cushioning pad 114, and this selected group of panes will be elevated (FIGS. 5 and 6) relative to the remaining panes in the "block". As this occurs, the selected group of panes, as a unit, will be raised into the space between the wheels 131 and 132 of the "backstop" assemblies and the front faces of the frame, to thus stabilize the upper edges of the selected panes against displacement in relation to the frame.

It should be noted that as the selected panes are initially elevated, the wheels 79 on the "feet" re-engage the surface of the now exposed remaining pane of glass in the "block", causing clockwise rotation of the wheels, which in turn causes the elongated side arms 92 and 93 to be extended as shown in broken lines in FIG. 9 so that the "head" portions of these arms project beyond the face 109 of the cushioning pad 108. As the bottom edges of the selected panes of glass are swung away from the "block" remaining by re-imposition of the wheels on the surface of the now exposed pane that remains, the elongated side arms are extended by gravity to their maximum extension as limited by the elongated bearing slots 94. Such projection of the "heads" 101 and 102 provides a measure of safety in the event the pane of glass carried by the upper inclined surfaces 112 of the cushion pads 108 slips therefrom. The extended arms with cushioned heads will effectively catch or intercept such displaced pane, thus preventing loss of the pane through breakage.

Figure 13:
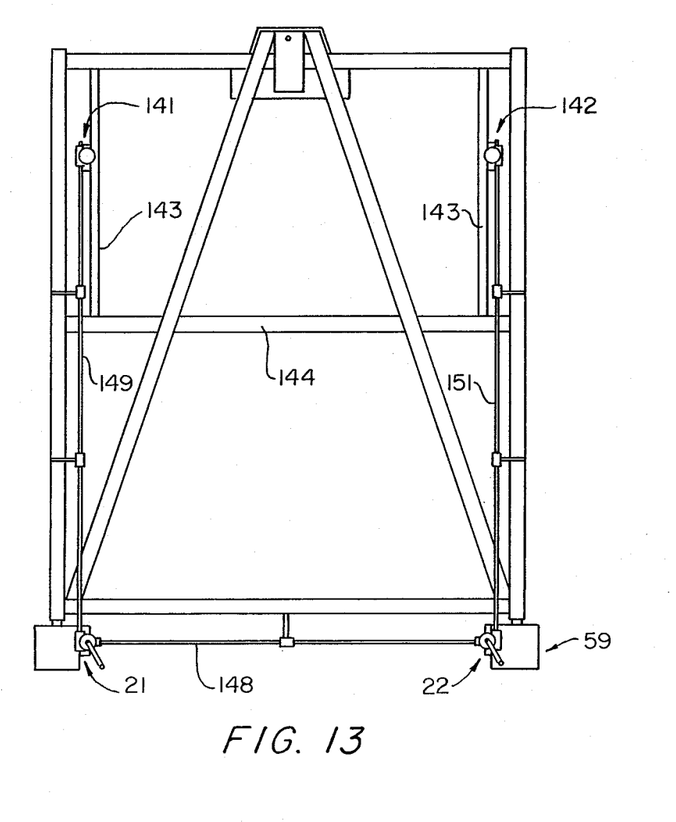
FIG. 13 is a rear elevational view of a preferred embodiment of my glass handling apparatus illustrating the use and automatic simultaneous adjustment of a plurality of gauges from a single drive.
Figure 14:
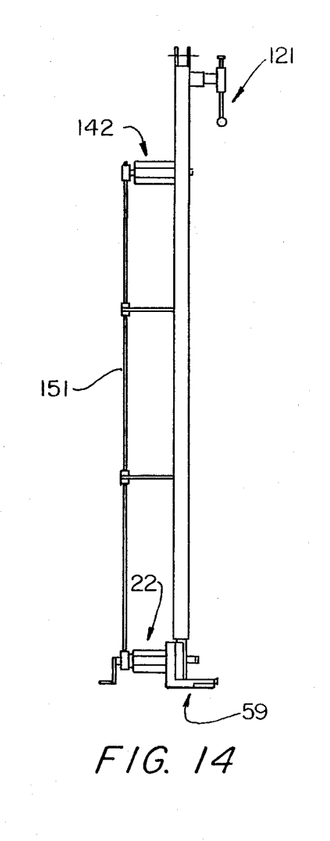
FIG. 14 is a side elevational view of the glass handling apparatus of FIG. 13.

The preferred embodiment of the apparatus illustrated in FIGS. 13 and 14 is an extension of the apparatus described above in that it utilizes all of the components described above, but rearranges the bracing of the frame to accommodate two additional adjustable gauge assemblies 141 and 142. As shown, these gauge assemblies, identical to those described above, are positioned on the frame so that their cushioning pads engage the first exposed pane 135 of the "block", thus preventing the side beams from physically contacting the glass. Thus, the gauge assembly 141 is mounted below the upper beam 4, and below the lowest point to which the "backstop" bar 127 and bearing wheels 131 and 132 extend. Each gauge is mounted on a vertical brace 143 as shown that extends between upper beam 4 and a median beam 144 extending horizontally across the frame and having opposite ends welded to the side beams 6 and 7.

To provide for simultaneous adjustment of all four adjustable gauges, each gauge assembly is provided with a right angle gear drive device designated generally by the numeral 146. Each gear drive device associated with each adjustable gauge assembly is mounted on the gauge assembly shaft 41 so that rotation of the shaft effects rotation of the bevel gears (not shown) within the housing 147 (FIG. 12). Horizontal shaft 148 connects the gear drive devices associated with gauge assemblies 21 and 22 adjacent the lower end of the frame. From the gear drive device associated with the gauge assembly 21, a vertical shaft 149 is provided connecting this gear drive device to the complementary gear drive device mounted in association with the gauge assembly 141. In like manner, a vertical shaft 151 connects the gear drive device associated with gauge assembly 22 with its complementary gear drive device associated with the gauge assembly 142.

It will thus be seen that when the crank-arms of either gauge assembly 21 or 22 is rotated, shafts 148, 149 and 151 will also rotate, effecting rotation in the appropriate direction of shafts 41 in the three other gauge assemblies, advancing or retracting the ram 27 of each by the same amount. Preferably, the amount of projection of the rams 27 of the gauge assemblies 141 and 142 are calibrated so that these rams project about one inch less in relation to the plane of the frame than the rams 27 of the two lower gauge assemblies 21 and 22. This provides for an adequate space between the pads 28 of the upper ram sets and the wheels 131-132 of the upper "backstop" members to receive the selected panes of glass therebetween.

Having thus described the invention, what is believed to be new and novel and sought to be protected by Letters Patent of the United States is as follows.

I claim:

1. A glass handling apparatus adapted to select and separate one or a predetermined finite number of panes of glass from a "block" thereof composed of a multiplicity of such panes of glass of uniform height and width stacked on edge on supporting stringers that provide a space below the "block", said multiplicity of panels of glass being stacked in contiguous juxtaposition, comprising:
   (a) a rectilinear frame adapted to be selectively placed in juxtaposition with respect to the "block" of glass panes;
   (b) means on the frame adapted to project a predetermined distance into the space beneath said "block" and thereby underlie the lower edges of a predetermined number of panes of glass the cumulative thicknesses of which are correlated to said predetermined distance whereby when said frame is elevated the predetermined number of panes of glass are engaged and elevated by said means above the remaining panels of glass in the "block"; and
   (c) means on said frame operatively associated with the edges of said panes of glass elevated above the remaining panes of glass in the "block" operative to retain the selected panes of glass in juxtaposition with the frame whereby when the frame is moved away from said "block" of remaining panes of glass the selected panes of glass move with the frame and are separated from the remaining panes of glass in the "block",
   (d) said means adapted to project under said "block" a predetermined distance correlated to the cumulative thickness of a selected number of said panes of glass comprise a pair of "feet" mounted on the frame and adapted to project into said space beneath the "block" of glass panes, each "foot" of said pair of "feet" including a monolithic bar projecting cantilever-like toward said "block" of glass panes when said frame is placed in juxtaposition therewith, said monolithic bar having on one end thereof a ramp adapted to engage a predetermined and selected pane of glass from the "block" that is contiguous to a juxtaposed pane of glass that is not selected and forms a part of the "block" that remains when the selected pane of glass is elevated, whereby said selected pane of glass is elevated in relation to said pane of glass not selected while said panes of glass remain in contiguous juxtaposition.

2. The combination according to claim 1, in which said frame includes upper, lower, left and right sides, and said means adapted to project under said "block" a predetermined distance correlated to a predetermined cumulative thickness of a predetermined number of panes of glass constitutes a pair of "feet" spaced apart and mounted on said lower side adjacent said left and right sides of the frame.

3. The combination according to claim 1, in which said means on said frame operative to retain the selected and separated panes of glass in juxtaposition with the frame includes a pair of bars spaced apart and slidably disposed in relation to the frame whereby said bars are automatically deployed to retain said selected number of panes of glass when they are elevated above the remaining panes of glass in the "block".

4. The combination according to claim 1, in which means are provided on said frame selectively adjustable to control the extent of projection of said means adapted to project into said space beneath said "block" of glass panes a predetermined distance correlated to the cumulative thickness of the number of panes selected, whereby the number of panes selected may be varied by varying the predetermined distance to correspond to the number of panes selected.

5. The combination according to claim 1, in which each said "foot" includes a wheel journaled thereon and adapted to rollably engage the exposed surface of the first pane of glass in said selected number of panes to be separated from said "block" when said frame is initially placed in juxtaposition therewith and lowered in relation thereto, and adapted to rollably engage the exposed surface of the first pane of glass that remains in said "block" when said selected number of panes are elevated, whereby said selected number of panes that are elevated are automatically separated from the "block" of panes that remain.

6. The combination according to claim 4, in which said means selectively adjustable for controlling the amount of projection of said means beneath said "block" to thereby select the number of panes to be elevatated includes a pair of housings mounted on the frame in spaced apart relationship adjacent said means adapted to project beneath said "block", a ram slidably mounted on each housing and having a free end selectively moveable toward and away from the plane of said frame, the free end of each said ram adapted to impinge against the exposed surface of the first pane of glass selected to be separated from said "block" when said means adapted to project beneath said "block" is disposed thereunder, and means for selectively advancing or retracting said rams a predetermined distance in relation to said means projecting under said "block" to thereby determine the number of panes of glass selected to be separated from said "block".

7. The combination according to claim 5, in which safety catch means are provided on each said "foot" cooperatively associated with said wheel and adapted to be retracted when said wheel rotates while said frame is being lowered and adapted to be extended into a glass-catching position when said wheel is rotated while said frame is being elevated.

8. The combination according to claim 1, in which said ramp comprises a cushioning pad having an inclined upper edge adapted to engage the edge of the associated pane of glass.

9. The combination according to claim 1, in which a cushioning pad is mounted on said monolithic bar and adapted to underlie said selected panes of glass while they are being elevated.

10. The combination according to claim 7, in which said safety catch means includes at least one pinion gear rotatably mounted on said "foot" for rotation with said wheel, an elongated safety arm slidably mounted on said "foot" and selectively movable between retracted and extended positions, and a gear rack fixedly mounted on said elongated safety arm and operatively engaged with said pinion gear, whereby rotation of said wheel while said frame is being lowered effects retraction of said safety arm and rotation of the wheel while said frame and selected panes of glass are being elevated effects extension of said safety arm.

11. The combination according to claim 4, in which two pairs of said means adapted to be selectively adjusted to control the extent of projection of said means beneath said "block" are provided, one pair thereof being mounted on said frame at a height below the upper edges of said panes of glass forming said "block", and the other pair being mounted on said frame above the lower edge of the panes of glass forming said "block", whereby when said frame is placed in juxtaposition with said "block" of panes of glass said pairs of means selectively adjustable to control the extent of projection of said first mentioned means beneath said "block" are both in contiguous engagement with the exposed surface of one of said selected panes of glass.

12. The combination according to claim 11, in which the pair of said means selectively adjustable to control the extent of projection of said first mentioned means beneath the "block" of glass mounted on said frame below the upper edges of said "block" of panes of glass project from said frame a distance less than the projection of the complementary pair of said means mounted on the frame above the lower edges of the panes of glass forming said "block".

13. The combination according to claim 12, in which means are provided interconnecting said pairs of means selectively adjustable to control the extent of projection of said first mentioned means beneath said "block" whereby selective adjustment of either of the two lower means effects adjustment of all of the interconnected means.

* * * * *